United States Patent [19]

Kauffman et al.

[11] Patent Number: 4,987,164

[45] Date of Patent: Jan. 22, 1991

[54] ULTRAVIOLET LIGHT STABLE POLYMERIC COMPOSITIONS

[75] Inventors: James W. Kauffman; Bruce R. Palmer, both of Edmond, Okla.

[73] Assignee: Kerr-McGee Chemical Corporation, Oklahoma City, Okla.

[21] Appl. No.: 347,191

[22] Filed: May 4, 1989

[51] Int. Cl.$^5$ .............................................. C08K 3/24
[52] U.S. Cl. ................................................. 524/413
[58] Field of Search ................ 524/413, 567; 523/220, 523/205

[56] References Cited

U.S. PATENT DOCUMENTS

| | | | |
|---|---|---|---|
| 2,140,236 | 12/1938 | Lederle et al. | 134/58 |
| 3,830,777 | 8/1974 | Lasseter | 524/413 |
| 3,852,238 | 12/1974 | Luce | 524/413 |
| 3,855,356 | 12/1974 | Luce | 524/413 |
| 4,009,043 | 2/1977 | Preis | 524/413 |
| 4,296,023 | 10/1981 | Vroomans | 524/413 |
| 4,619,957 | 10/1986 | Reid et al. | 524/91 |
| 4,798,863 | 1/1989 | Leland et al. | 524/413 |
| 4,806,586 | 2/1989 | Nakai | 524/413 |

FOREIGN PATENT DOCUMENTS 58-179253  10/1983  Japan.
62-129346  6/1987  Japan.

OTHER PUBLICATIONS

Kirk-Othmer *Encyclopedia of Chemical Technology*, 2ed (1968), vol. 16, p. 18.
Kirk-Othmer *Encyclopedia of Chemical Technology*, 2ed (1968), vol. 20, p. 413.
Kirk-Othmer *Encyclopedia of Chemical Technology*, 2ed (1968), vol. 21, pp. 369–379.

*Primary Examiner*—Veronica P. Hoke
*Attorney, Agent, or Firm*—Herbert M. Hanegan; John P. Ward

[57] ABSTRACT

Ultraviolet light stable polymeric resin compositions comprising an ultraviolet light degradable polymeric resin component and an effective ultraviolet light absorbing amount of a particulate metal titanate component.

1 Claim, 1 Drawing Sheet

ULTRAVIOLET LIGHT STABLE POLYMERIC COMPOSITIONS

FIELD OF THE INVENTION

This invention relates to improved ultraviolet light stabilized polymeric resin compositions, and to a method for their preparation. The invention further relates to a novel means for improving the ultraviolet light stability of ultraviolet light degradable polymeric resin materials.

BACKGROUND OF THE INVENTION

It is widely known that ultraviolet light radiation, whether from a natural source such as the sun or an artificial source such as interior lighting, can accelerate both the physical and chemical breakdown or deterioration of various polymeric resin materials. For example, it is known that polyolefin, acrylic, polycarbonate, polyvinylaromatic, polyester, polyamide and polyvinylchloride resin materials are all susceptible, to one degree or another, to both physical and chemical degradation when exposed to ultraviolet light radiation.

To protect these polymeric resin materials against deleterious effects of ultraviolet light radiation, a number of commercial ultraviolet light absorbing additive agents have been developed. In general, these commercial light absorbing agents will provide the stability desired in otherwise ultraviolet light degradable polymeric resin materials either by absorbing the ultraviolet light radiation directly or by harmlessly dissipating this particular light energy through intermolecular energy processes.

In the main, the most widely employed commercial ultraviolet light absorbing additive agents are organic in nature and generally can be grouped into five basic categories. These categories include (1) hydroxybenzophenones, (2) hydroxyphenylbenzotriazoles, (3) salicylates, (4) aryl substituted acrylates and (5) aminobenzoates. While these organic additives function as ultraviolet light absorbents, they are costly to produce and can add significantly to the cost of formulated polymeric resin materials containing them.

A less expensive commercially available material for use as an ultraviolet light absorbing additive agent in certain types of polymeric resin materials is the inorganic metal oxide, titanium dioxide. Its use for such purposes is known from U.S. Pat. No. 4,619,957 wherein it is disclosed that titanium dioxide is added to poly(vinylchloride) resin formulations not only to provide pigmentation in the formulations but also to impart improved ultraviolet light stability to such formulations. It further is disclosed in this patent that one problem with the use of titanium dioxide for this purpose is that due to the high loadings required and the strong tinting strength of the titanium dioxide, it is not possible to fabricate products from such resin formulations in colors other than white or light pastel colors. To overcome this problem, the solution proposed in this patent is to replace a portion of the titanium dioxide in such resin formulation with certain ultraviolet light absorbing benzoate compounds.

According to the disclosures in the above patent, reduction of the titanium dioxide levels in such resin formulations allows for the manufacture of fabricated products in darker shades or colors. The added benzoate compounds function to maintain the stability of the fabricated products, formerly provided by the high levels of titanium dioxide, against degradation by ultraviolet light radiation.

Another drawback to the use of titanium dioxide is that this pigment does not appear to be universally suited for use as an ultraviolet light absorbing additive agent in all ultraviolet light degradable polymeric resins. For example, when added to ultraviolet light degradable polyamides (e.g., nylons) as a delusterant, titanium dioxide is believed to act as a photosensitizer and, in effect, increases the rate of photodegradation of the polyamide particularly at the longer wavelengths in the ultraviolet light resin. Thus, to provide ultraviolet light stability to a polyamide containing titanium dioxide it is usual practice to further add to the polyamide resin formulation a stabilizing compound such as a manganese salt together with other additives such as hypophosphorous acids, phosphites, phosphates, and the like. Kirk-Othmer *Encyclopedia of Chemical Technology*, Vol. 16, page 81, 2ed. (1968).

It is clear from the above that ultraviolet light stabilized polymeric resin compositions have been prepared from a wide variety of ultraviolet light degradable polymeric resin materials and ultraviolet light absorbing additive agents. However, a need still exists for ultraviolet light stabilized polymeric resin compositions that are more economical to produce than those based on the use of the aforementioned organic ultraviolet light absorbing agents and which compositions are not bothered by problems, such as those mentioned above, associated with the use of inorganic ultraviolet light absorbing agents such as titanium dioxide.

SUMMARY OF THE INVENTION

In accordance with the present invention, economical ultraviolet light stable polymeric resin compositions are provided which comprise an ultraviolet light degradable polymeric resin component and an effective ultraviolet light absorbing amount of a particulate metal titanate component. The metal titanate component of the ultraviolet light stable polymeric resin compositions of this invention comprises at least one metal titanate compound corresponding to the broad general formula $M_aM'_bTi_cO_d$ in which M and M' are different metals selected from Groups Ia, IIa, IIb, IIIa, IIIb, IVa, IVb, Va, VIIb and VIII of the Periodic Table of the Elements, and in which a is a number ranging from about 0.1 to about 15, b is a number ranging from 0 to about 15, c is a number ranging from about 1 to about 25 and d is a number ranging from about 2.1 to about 55.

DETAILED DESCRIPTION OF THE INVENTION

Figure 1:
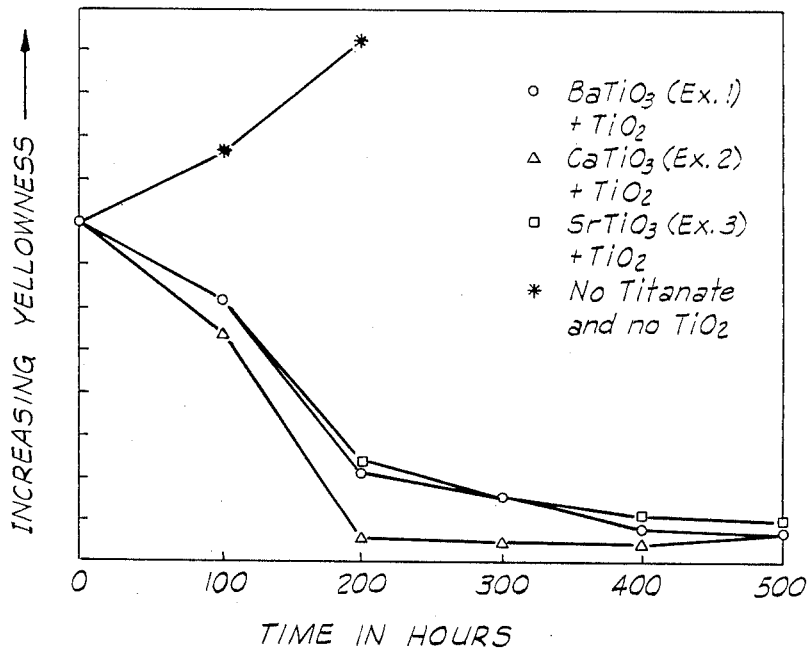
FIG. 1 is a graphical illustration of the ultraviolet light stability of the compositions of the present invention when exposed to a source of ultraviolet light.

Broadly, the present invention relates to ultraviolet light stable polymeric resin compositions comprised of an ultraviolet light degradable polymeric resin component and a particulate metal titanate component capable of absorbing ultraviolet light of wavelengths of about 400 nm and below. In general, the resin component of the resin compositions of this invention will comprise any thermosetting and thermoplastic ultraviolet light degradable polymeric resin material capable of being fabricated into products such as, for example, decorative and protective coatings, films and sheeting, and any other products produced by way of any of the variously known molding, extrusion and calendering techniques.

Typically, the polymeric resin materials useful in preparing the ultraviolet light stable polymeric resin compositions of this invention will comprise any of the well-known resin materials such as polyolefin, polyvinylaromatic, acrylic, polycarbonate, polyester, polyamide and polyvinylhalide resins. All of these disclosed resin materials are known to be susceptible to degradation, to one degree or another, upon being exposed to ultraviolet light radiation.

Representative, but nonlimiting, examples of specific polymeric resin materials useful as the resin component in the ultraviolet light stable polymeric resin compositions of this invention include polyolefin resins such as polyethylene and polypropylene and the like; polyvinylaromatic resins such as polystyrene and copolymers and terpolymers therefor, such as poly(styrene-acrylonitrite) and poly(styrene-butadieneacrylonitrile) and the like; acrylic resins such as poly(acrylic acid), poly(methacrylic acid), poly(methyl acrylate), poly(methyl methacrylate) and the like; polycarbonate resins such as those obtained either by the phosgenation of dihydroxy aliphatic and aromatic monomers such as ethylene glycol, propylene glycol, bisphenol A (i.e., 4,4'-isopropylidene diphenol) and the like, or by the base catalyzed transesterification of bisphenol A with diphenylcarbonate to produce bisphenol A polycarbonate; polyester resins such as poly(ethylene terephthalate), poly(butylene terephthalate) and the like; polyamide resins such as nylon-6, nylon-6,6 and the like; epoxy resins such as poly(epichlorohydrin/bisphenol A) and the like, and esters thereof such as the epoxy resin esters prepared by the esterification of poly(epichlorohydrin/bisphenol A) with a fatty acid, rosin acid, tall oil acid or mixtures thereof; and phenolic resins such as those prepared by reaction of formaldehyde with phenol, resorcinol, cresol, xylenol, p-tert-butylphenol and the like.

Particularly useful ultraviolet light stable polymeric resin compositions of the present invention, however, are those polymeric resin compositions wherein the polymeric resin component comprises a poly(vinylhalide) resin. Such preferred poly(vinylhalide) resins include poly(vinylchloride) homopolymer resins as well as poly(vinylchloride) copolymer resins resulting from the copolymerization of vinyl chloride monomer with a second monomer such as, for example, other unsaturated halogenated hydrocarbons, styrene and its halogenated derivatives, vinyl esters and ethers, olefins, dienes, esters and other derivatives of acrylic and methacrylic acids, and olefinic dicarboxylic acids and esters thereof. Representative examples of such copolymerizable second monomers or comonomers include vinylidene chloride, vinyl acetate, vinyl isobutyl ether, ethylene, propylene, isoprene, butadiene, methyl acrylate, methyl methacrylate and the like. Typically, commercially available poly(vinylchloride) copolymer resins can contain from about 2 to about 20 weight percent of the copolymerized comonomer. A more detailed description of poly(vinylchloride) homopolymer and copolymer resins useful as the polymeric resin component in the ultraviolet light stabilized polymeric resin compositions of this invention can be found in Kirk-Othmer, *Encyclopedia of Chemical Technology*, Volume 21, pp 369–379 and pp 402–405, 2ed. (1968), the teachings of which are incorporated herein in their entirely by reference. Particularly useful poly(vinylchloride) resins for preparing the UV light stabilized polymeric resin compositions of this invention are the rigid poly(vinylchloride) homopolymer resins.

In addition to the polymeric resin component described above, the ultraviolet light stable polymeric resin compositions of this invention also contain an effective ultraviolet light absorbing amount of a particulate metal titanate as an ultraviolet light stabilizing component. In general, the particulate metal titanates useful in preparing the polymeric resin compositions of this invention comprise those metal titanates corresponding to the broad general formula $M_aM'_bTi_cO_d$. With regard to this general formula, M and M' represent different metals selected from Groups Ia, IIa, IIb, IIIa, IIIb, IVa, IVb, Va, VIIb and VIII of the Periodic Table of the Elements and a is a number ranging from about 0.1 to about 15, b is a number ranging from 0 to about 15, C is a number ranging from about 1 to about 25 and d is a number ranging from about 2.1 to about 55. The metal titanates corresponding to this broad general formula further are characterized in that each of the metals M and M' as well as Ti (titanium) are in their most stable oxidation state and O (oxygen) is in stoichiometric balance with each of M, M' and Ti such that the overall charge of these titanates is zero.

In a more preferred embodiment of this invention, the particulate metal titanates found to provide particularly stable polymeric resin compositions include those metal titanates corresponding to the above broad general formula wherein the subscript "b" is zero. In this preferred embodiment, the particulate metal titanates useful in this invention can be represented by the general formula $M_aTi_cO_d$ wherein M, a, c and d have the same meanings and values and the compounds themselves the same characteristics as disclosed immediately above. However, the most useful titanate compounds corresponding to the formula $M_aTi_cO_d$ are those wherein M is a metal selected from Groups Ia, IIa and IIIa of the Periodic Table of the Elements and specifically, the metals sodium, potassium, calcium, strontium, barium and aluminum belonging to these Groups, a is a number ranging from 1 to 2, c is a number ranging from 1 to 2 and d is a number ranging from 3 to 5.

In general, the metal titanates corresponding to the above general formulae and useful in the preparation of the ultraviolet light stable polymeric resin compositions of this invention can be prepared by known techniques. For instance, these metal titanates can be prepared by first forming a reactive mixture of one or more oxides, hydroxides or carbonates of one or more of the above identified metals with a reactive titanium compound such as titanium dioxide in any desired proportions and then heating the mixture to elevated temperatures and maintaining the mixture at such elevated temperatures until reaction of the ingredients in the mixture to the desired metal titanate is achieved. An example of one such method for preparing metal titanates in this manner is the method described in U.S. Pat. No. 2,140,236 for preparing titanates of metals of Groups Ia and IIa of the Periodic Table of the Elements, i.e., titanates of the alkali and alkaline earth metals. Metal titanates corresponding to the above general formulae also can be prepared by sintering or fusing together one or more oxides of one or more of the above defined metals with titanium dioxide. The preparation of aluminum titanate, as disclosed herein, can be performed in this manner. (Kirk-Othmer, *Encyclopedia of Chemical Technology*, Volume 20, page 413, 2ed. (1968)).

Particularly useful metal titanates corresponding to the above general formulae include the meta-, di-, tri- and ortho-titanates of the metals lithium, sodium, potassium, calcium, barium, strontium and aluminum and both chemical and physical mixtures thereof. Specific representative, but nonlimiting, examples of such particularly useful metal titanates include lithium metatitanate ($Li_2TiO_3$), lithium dititanate ($Li_2Ti_2O_5$), lithium orthotitanate ($Li_4TiO_4$), sodium metatitanate ($Na_2TiO_3$), sodium dititanate ($Na_2Ti_2O_5$), sodium titanate ($Na_2Ti_3O_7$), potassium metatitanate ($K_2TiO_3$), potassium dititanate ($K_2Ti_2O_5$), calcium metatitanate ($CaTiO_3$), strontium metatitanate ($SrTiO_3$), barium metatitanate ($BaTiO_3$) and aluminum metatitanate ($Al_2TiO_5$) and both chemical and physical mixtures thereof. Of the above representative metal titanates the calcium, strontium, barium and aluminum titanates have been found to be especially well suited to preparing the stable polymeric resin compositions of this invention. All are obtained as white products, all have indexes of refraction less than titanium dioxide (and thus scatter light less efficiently than titanium dioxide) and all absorb ultraviolet light radiation at wavelengths of 400 nm or below.

Typically, the size range of the above described particulate metal titanates will be from about 0.01 to about 10 microns in diameter. Preferably, these particulate metal titanates will range in size from about 0.1 to about 1.0 microns in diameter.

As disclosed above, the polymeric resin compositions of this invention will comprise a polymeric resin component and an effective ultraviolet light stabilizing amount of the herein described particulate metal titanates. Typically, these polymeric resin compositions will contain from about 0.1 to about 25 weight percent and preferably from about 2 to about 20 weight percent of the particulate metal titanate based on 100 parts by weight of the polymeric resin component in the polymeric resin compositions. With particular regard to the above described poly(vinylchloride) resins it surprisingly has been found that while these amounts provide substantially the same degree of ultraviolet light stability as equivalent amounts of pigmentary titanium dioxide, the use of the particulate metal titanate does not give rise to the aforementioned drawback associated with the use of pigmentary titanium dioxide. That is, when a particulate metal titanate as defined herein is incorporated into a poly(vinylchloride) resin to form a polymeric resin composition of this invention, significantly darker shades or colors can be attained compared to poly(vinylchloride) resin compositions containing an equivalent amount of titanium dioxide and colorant. Utilizing the particulate metal titanates as defined herein, it also is possible to obtain the same lighter shades or colors as in polymeric resin compositions containing pigmentary titanium dioxide, but at substantially lower concentrations of the colorant.

The ultraviolet light stable polymeric resin compositions of this invention further can contain other conventional additives known in this art. Representative, but nonlimiting, examples of such conventional additives include thermal stabilizers, impact modifiers, lubricants or processing acids, fillers, both organic and inorganic color pigments and plasticizers. These ingredients can be incorporated into the polymeric resin compositions by conventional blending techniques including milling, Banbury or dry powder mixing techniques.

As mentioned hereinabove, particularly useful ultraviolet light stable polymeric resin compositions of the present invention are those resin compositions preferably containing a poly(vinylchloride) resin as the polymeric resin component. Such poly(vinylchloride) resin compositions, containing the particulate metal titanates as disclosed herein either as complete or partial replacements for the more commonly employed titanium dioxide, exhibit excellent stability during processing and excellent ultraviolet light stability upon exposure to a source of ultraviolet light radiation such as the sun.

The following examples are intended to illustrate the preparation of the polymeric resin compositions of the present invention and their stability upon exposure to a source of ultraviolet light. In these examples all parts and percentages are by weight unless otherwise specified.

EXAMPLE 1

An ultraviolet light stable polymeric resin composition of the present invention was prepared by dry blending 4.5 parts of barium titanate ($B_aTiO_3$), 4.5 parts of titanium dioxide ($TiO_2$) and 100 parts of a poly(vinylchloride) siding formulation. This siding formula was comprised of 90 parts of a rigid poly(vinylchloride) resin, 1.34 parts of Thermolite T137, a tin based thermal stabilizer available from M & T Chemicals, Inc., 1.12 parts of calcium stearate, 0.9 parts of Hostalub XL165, a lubricant available from the Hoeschst Celanese Corporation, 1.34 parts of K120N Acryloid, a processing aid available from Rohm & Haas Company and 5.3 parts of chlorinated polyethylene.

The dry blended mixture then was introduced into a Brabender plastograph mixer wherein it was kneaded into a plastic dough at a rotational speed of 120 rpm and a temperature of 180° C. over a period of seven minutes. No evidence of degradation of the poly(vinylchloride) resin in the plastic dough thus produced was observed.

The plastic dough then was hot pressed into a number of rigid sheets having dimensions of 3.5×6×0.04 inches. Each of the sheets was produced at a temperature of about 193° C. and a ram pressure in the range of from about 30,000 to about 35,000 psig over a period of about one minute. The sheets, when removed from the press, were visually observed to be nearly white in color indicating that no degradation of the poly(vinylchloride) resin in the sheets had taken place.

EXAMPLE 2

A second ultraviolet light stable polymeric resin composition was prepared employing the identical procedures and substantially the same ingredients as employed in Example 1. The single exception was that in this Example 2, 4.5 parts of calcium titanate ($CaTiO_3$) was employed in place of the $BaTiO_3$ employed in Example 1.

The resulting dry blended mixture was kneaded into a plastic dough and then hot pressed into a number of rigid sheets in the same identical manner as described above. Again, neither the plastic dough nor the pressed sheets exhibited signs of degradation of the poly(vinylchloride) resin contained therein.

EXAMPLE 3

A third ultraviolet light stable polymeric resin composition was prepared employing the same identical procedures and substantially the same ingredients as employed in Example 1. Again, the single exception was that in this Example 3 strontium titanate (SrTiO$_3$) was employed in place of the BaTiO$_3$.

The dry blended mixture again was kneaded into a plastic dough in the Brabender plastograph and the dough finally hot pressed into rigid sheets having the above described dimensions. Neither the dough nor the pressed sheets exhibited signs of degradation of the poly(vinylchloride) resin contained therein.

To test the ultraviolet stability of the polymeric resin compositions prepared in Examples 1 through 3 above, the rigid sheets molded from these resin compositions were subjected to the accelerated QUV weathering test. For purposes of comparison, a rigid test sheet molded from the same base poly(vinylchloride) siding formulation as employed in Examples 1 through 3 above but without any metal titanate or titanium dioxide pigment having been added thereto also was prepared and subjected to the accelerated QUV test. Utilizing this test, the ultraviolet light stability of the polymeric resin compositions of Examples 1 through 3 and of the base siding formulation were quickly determined by measuring the increase in the yellowness of the rigid sheets prepared therefrom with time. Any increase in the yellowness of the rigid test sheets indicates degradation of the resin composition contained in the sheets to be occurring. The results are graphically illustrated in FIG. 1. From FIG. 1 it can be seen that the rigid test sheets prepared from the resin compositions of Examples 1 through 3 exhibit a significantly decreased rate of yellowing (i.e., degradation) compared to the rigid test sheet formed from the base siding formulation alone. This decreased rate continues over many hundreds of hours of exposure to the ultraviolet light source and indicates that the resin compositions of Examples 1 through 3 possessed excellent resistance to attack by ultraviolet light.

Figure 2:
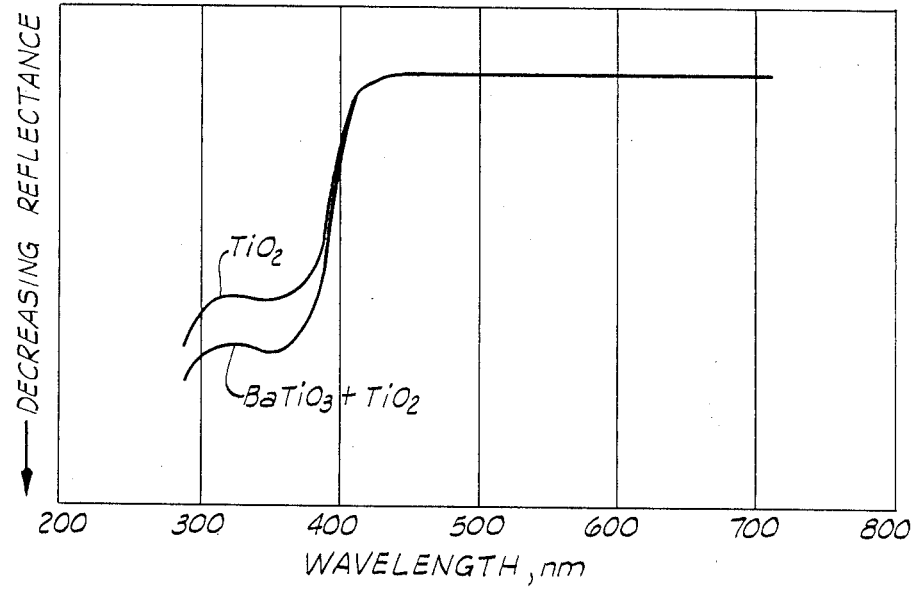
FIG. 2 is a graphical illustration of the diffuse reflectance spectrum for the metal titanate, barium titanate, versus the diffuse reflectance spectrum for titanium dioxide.

As is clear from the above description, each of the siding formulations of Examples 1 through 3 above contained, in addition to the particular metal titanate identified, a quantity of titanium dioxide which is known to be an ultraviolet light absorbing material. To demonstrate the ultraviolet light absorbing capabilities of the metal titanates themselves, a series of powder samples was prepared in which each sample contained 4 percent by weight of one of the metal titanates employed in the Examples above and 4 percent by weight of a titanium dioxide pigment. In each instance, the remainder of the sample comprised magnesium dioxide as an inert carrier or matrix material. A reference sample comprised of only the titanium dioxide pigment and the inert matrix material also was prepared. Each of the samples, including the reference sample, then was exposed to a source of ultraviolet light radiation and the diffuse reflectance generated by each sample measured and recorded. Referring to FIG. 2, which is the diffuse reflectance spectrum for the sample containing barium titanate (B$_a$TiO$_3$), it is plainly evident that the presence of the barium titanate provided a significant decrease in diffuse reflectance compared to the reference sample containing only the titanium dioxide. The magnitude of the decrease can be attributed solely to the ultraviolet absorbing capability of the barium titanate itself. Decreases in diffuse reflectance also were observed for the samples containing the calcium titanate (CaTiO$_3$) and strontium titanate (SrTiO$_3$), respectively. The observed decrease in the diffuse reflectance of the samples containing the metal titanates demonstrates the ultraviolet light absorbing capability of these materials and thus the benefit to be gained by their use in the polymeric resin compositions of the present invention.

While the present invention has been described in terms of what are considered to be the preferred embodiments, it is to be understood that changes may be made thereto without departing from the spirit and scope thereof.

We claim:

1. The ultraviolet light stable polymeric resin compositions comprising:
   a poly(vinylchloride) resin as an ultraviolet light degradable polymeric resin component; and
   from about 0.1 to about 25 weight percent based on the weight of said polymeric resin of a particulate metal titanate component corresponding to the formula $M_aTi_cO_d$ wherein M is a metal selected from Groups Ia, IIa, and IIIa of the Periodic Table of the Elements, a is a number ranging from about 1 to about 2, c is a number ranging from about 1 to about 2 and d is a number ranging from about 3 to about 5, wherein both M and Ti are present in said particulate titanate in their most stable oxidation state and O is in stoichiometric balance with M and Ti such that said particulate titanate possesses a zero charge and wherein said particulate titanate further is characterized as being comprised of particles ranges in size from about 0.01 to about 10 microns in diameter and capable of absorbing ultraviolet light of wavelenghths of about 400 nm and below.

* * * * *